United States Patent [19]
Czech et al.

[11] Patent Number: 5,524,952
[45] Date of Patent: Jun. 11, 1996

[54] SEMI-AMBULATORY COMPANION SEATING SYSTEM AND METHOD

[75] Inventors: Edward A. Czech; Alfred L. Budd, both of Winamac, Ind.

[73] Assignee: Braun Corporation, Winamac, Ind.

[21] Appl. No.: 238,278

[22] Filed: May 3, 1994

[51] Int. Cl.⁶ ..................................................... B60N 1/04
[52] U.S. Cl. .................................. 296/65.1; 297/344.24
[58] Field of Search ............... 296/65.1, 63; 297/344.21, 297/344.24

[56] References Cited

U.S. PATENT DOCUMENTS

| | | | |
|---|---|---|---|
| 2,792,951 | 5/1957 | White | 297/344.24 X |
| 3,051,522 | 8/1962 | Myers | 297/344.24 X |
| 4,155,587 | 5/1979 | Mitchell . | |
| 4,483,653 | 11/1984 | Waite . | |
| 4,664,584 | 5/1987 | Braun et al. . | |
| 4,733,903 | 3/1988 | Bailey . | |
| 5,180,275 | 1/1993 | Czech et al. . | |
| 5,261,779 | 11/1993 | Goodrich . | |
| 5,301,993 | 4/1994 | Zalewski | 296/65.1 |

OTHER PUBLICATIONS

Braun Corp., 6–Way Power Seat, Product Literature dated Aug. 1988.
BEV AB, Car Modification Products Catalog 1991–1992, pp. 1–8, 16–17.
Dr. Leonard's Health Care Catalog, no date available, p. 2, item #9025/9026.

*Primary Examiner*—Joseph D. Pape
*Attorney, Agent, or Firm*—Jacques M. Dulin

[57] ABSTRACT

A semi-ambulatory companion seating system including a base unit assembly, a carriage assembly, and a pivotable seat support assembly. The base unit assembly includes spaced apart side rails, each having an external and an internal track. Each of the internal tracks are generally horizontal throughout, and each of the external tracks has a generally horizontal section terminating in an inclined section. The carriage subassembly includes a generally rectangular framework having six rollers to move the carriage on the internal and external tracks. Four rollers are guided in the internal tracks. Two rollers, mounted on an outrigger disposed along the inboard end of the carriage assembly, are guided in the external tracks. The outboard end of the carriage assembly includes an axle bushing for receiving an axle of the pivotable seat support assembly mounted thereon. The seat assembly includes a seat base box-plate assembly having holes aligned to receive the bolts of a standard vehicle seat. A latch assembly is attached to the underside of the seat base box-plate to engage the seat support assembly in either a forward facing position or an outboard facing position. In use, the seat assembly is rotated in either a powered or manual manner. The latch assembly also includes a means for engaging an interlock switch so that the seat may not be moved laterally outboard until the seat is positively engaged in the outboard facing position. The carriage is then powered in a lateral outboard motion by following the horizontal track sections. As the rollers engage the inclined section of the external tracks, the carriage inboard end rises while the carriage simultaneously pivots on the midpoint rollers so that the carriage outboard end dips downwardly. The carriage continues in a laterally outboard and downwardly tilted motion to place the passenger in a feet-on-the-ground position. On entry of the vehicle, these motions are reversed.

28 Claims, 8 Drawing Sheets

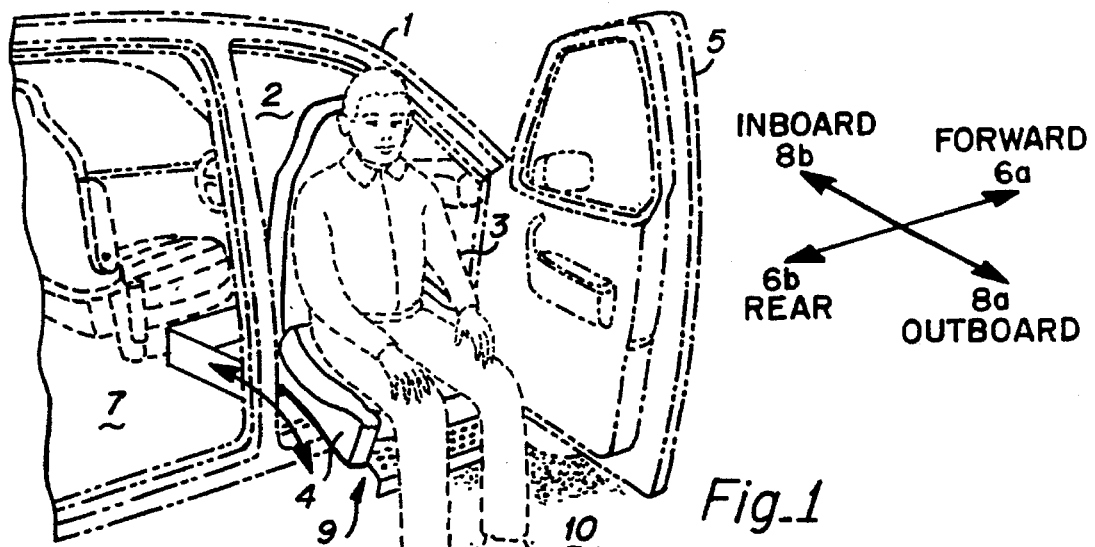
Fig_1
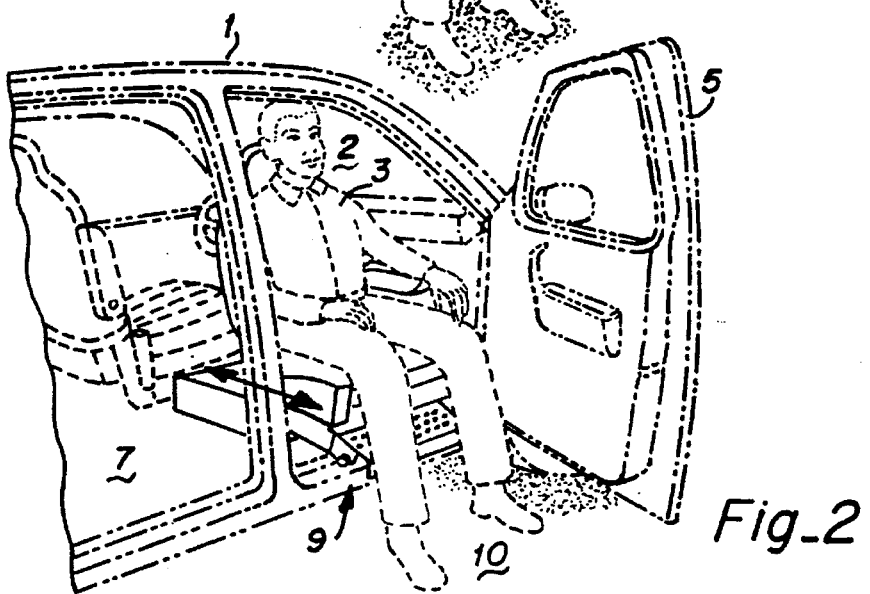
Fig_2
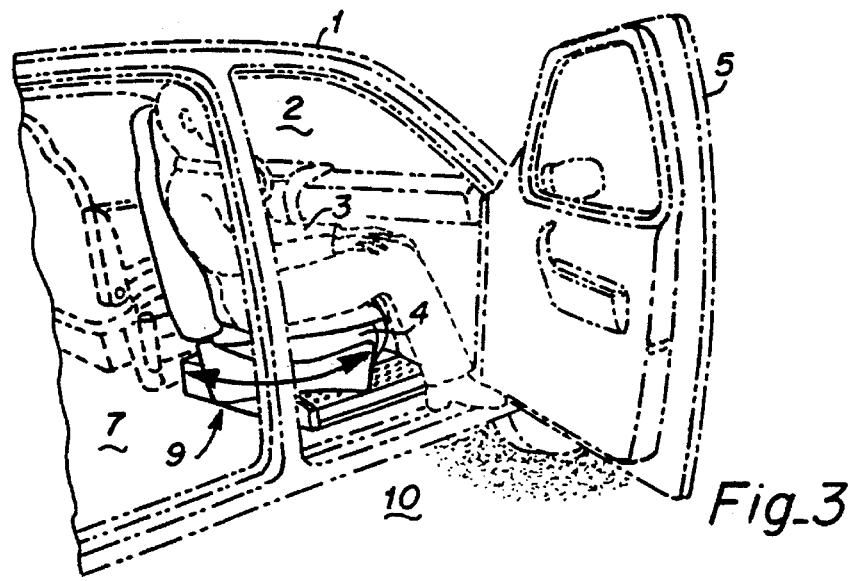
Fig_3

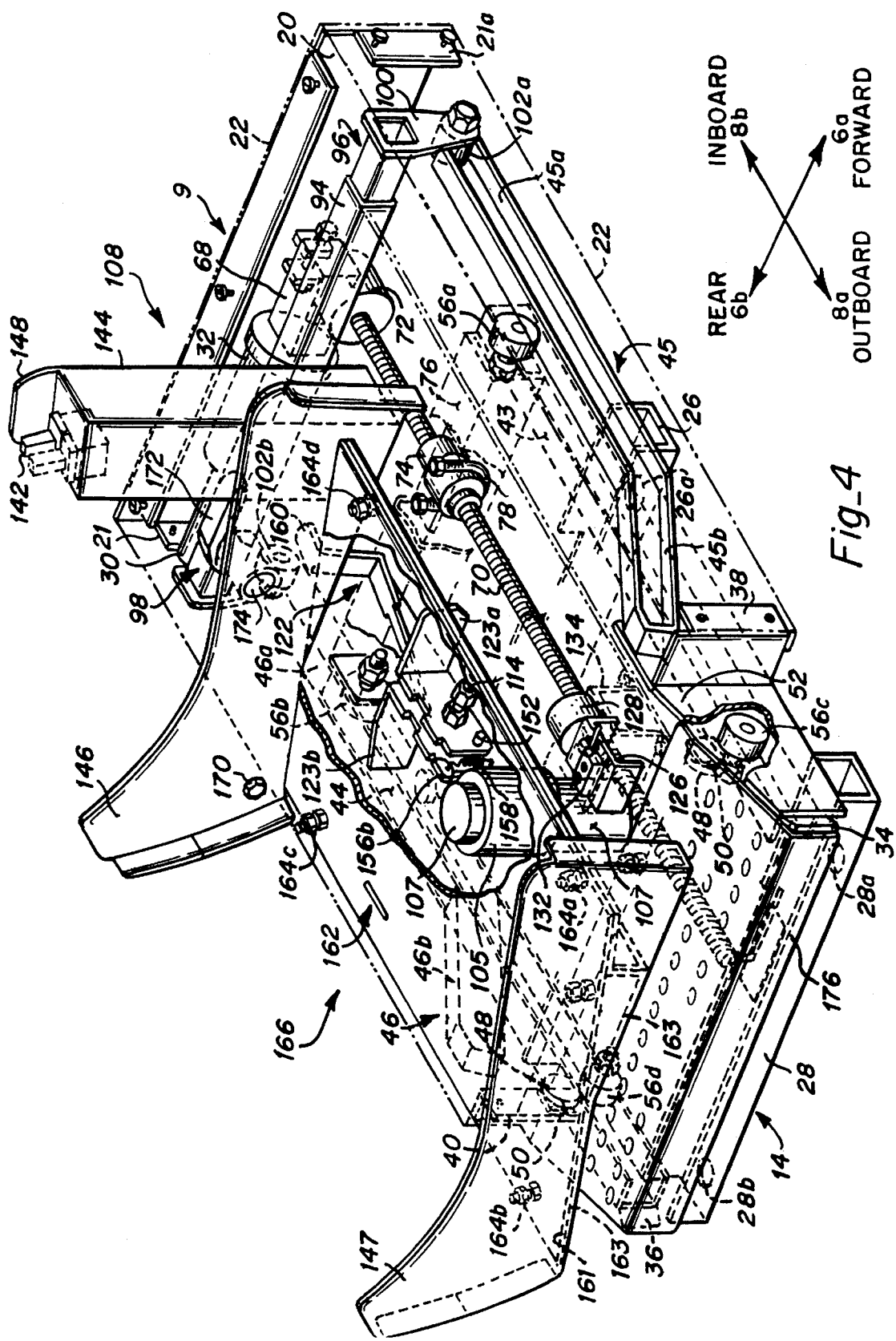

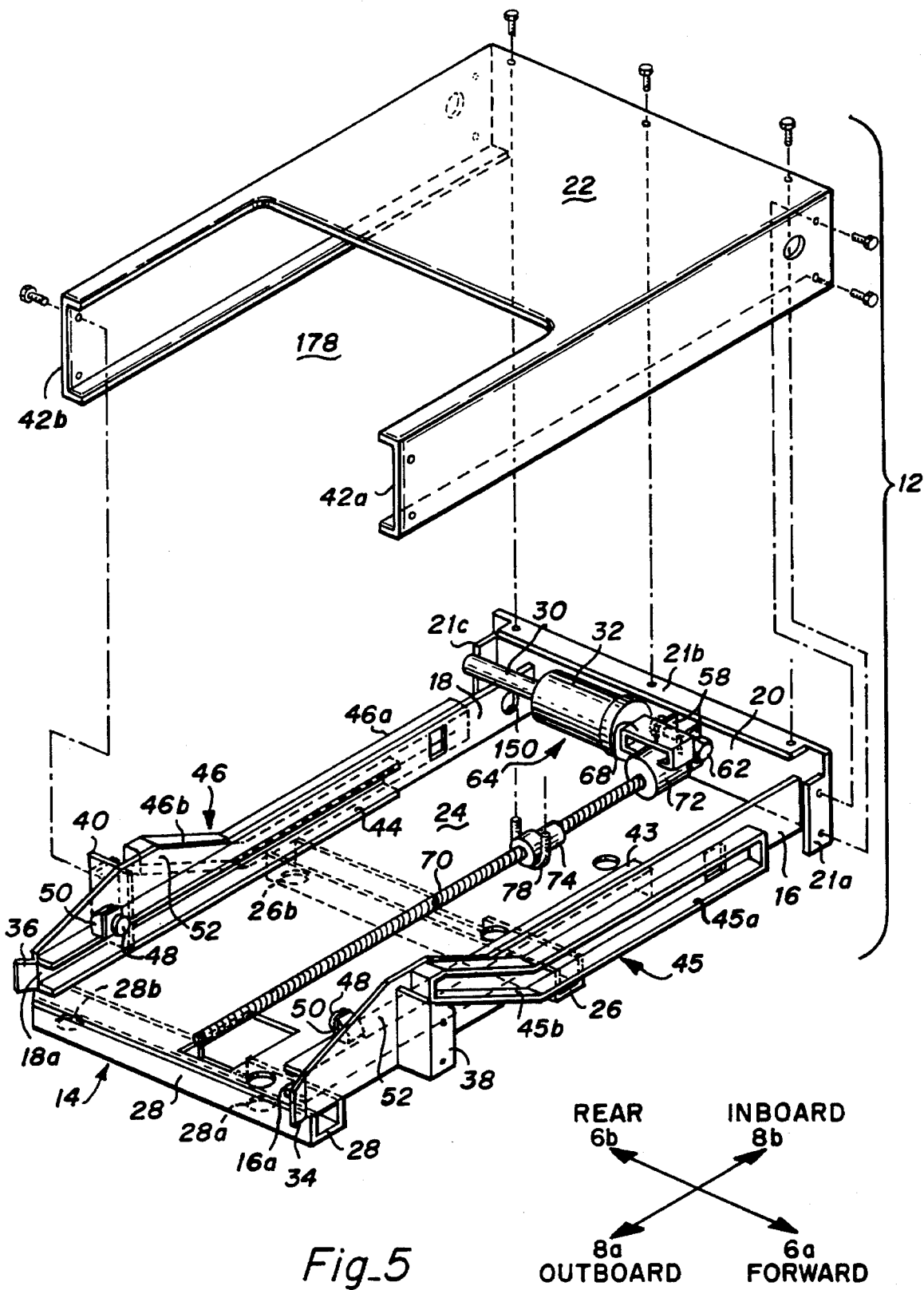
Fig_5

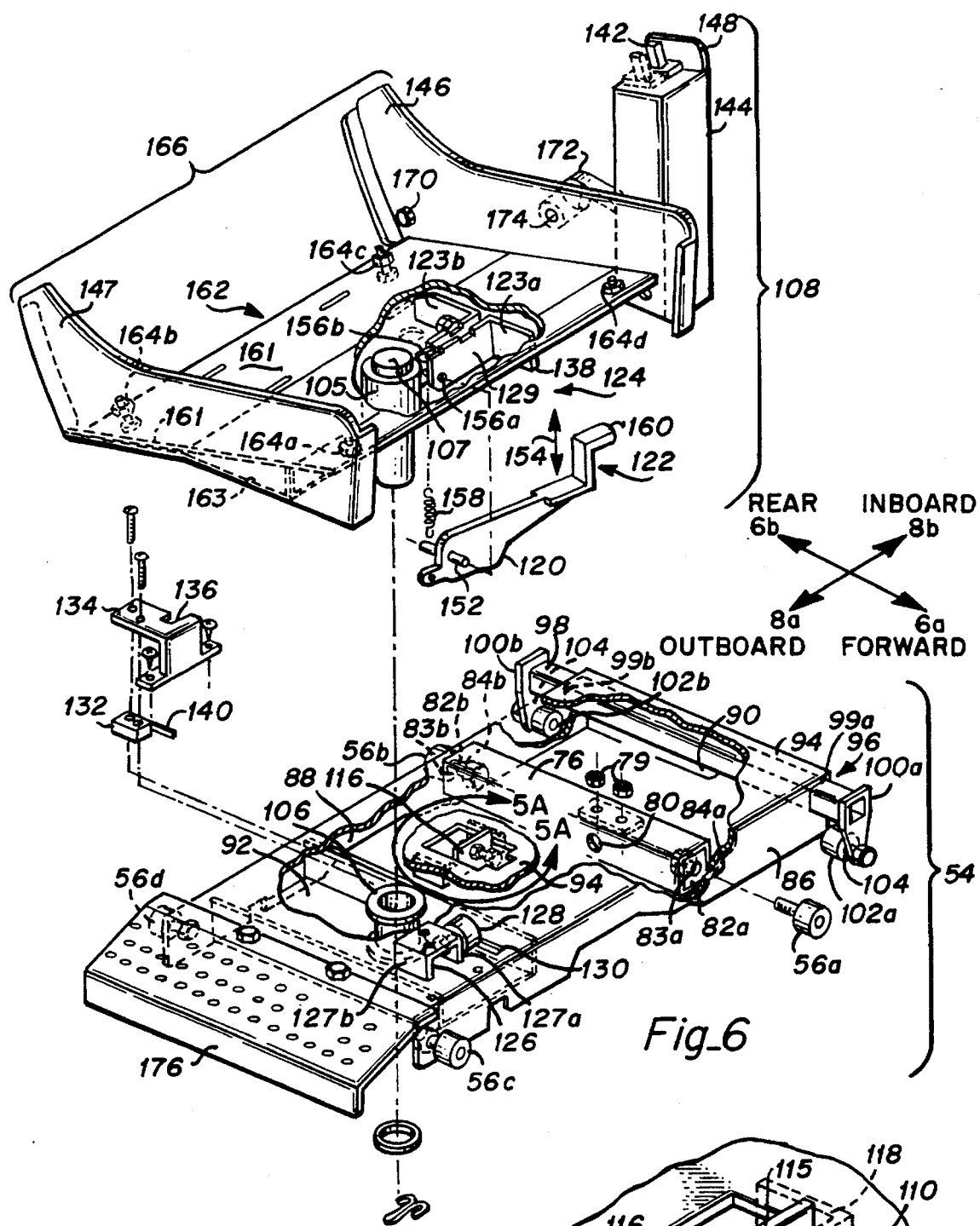
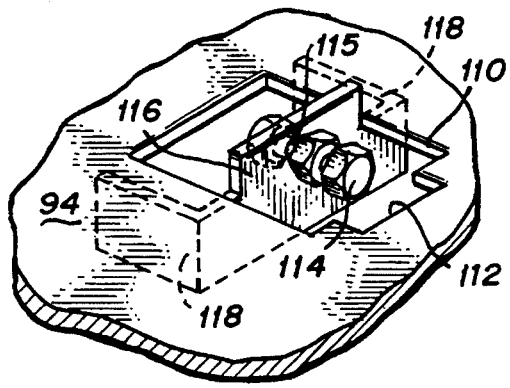
Fig_6
Fig_7

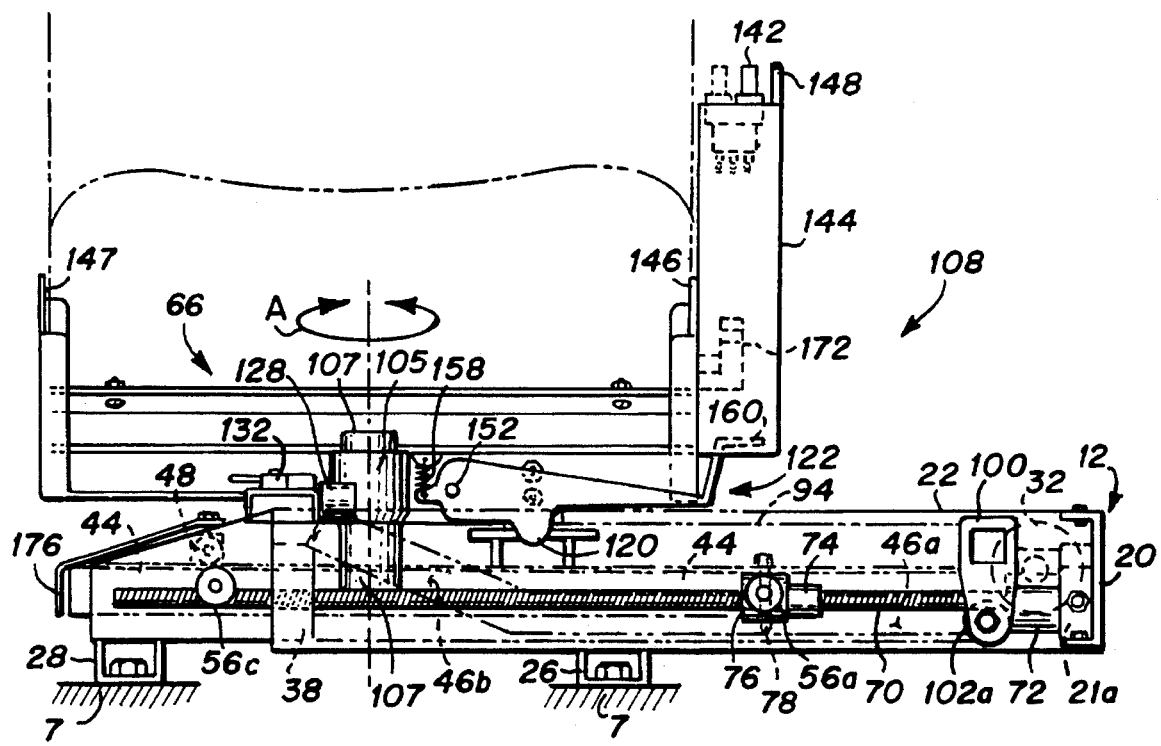
Fig_8
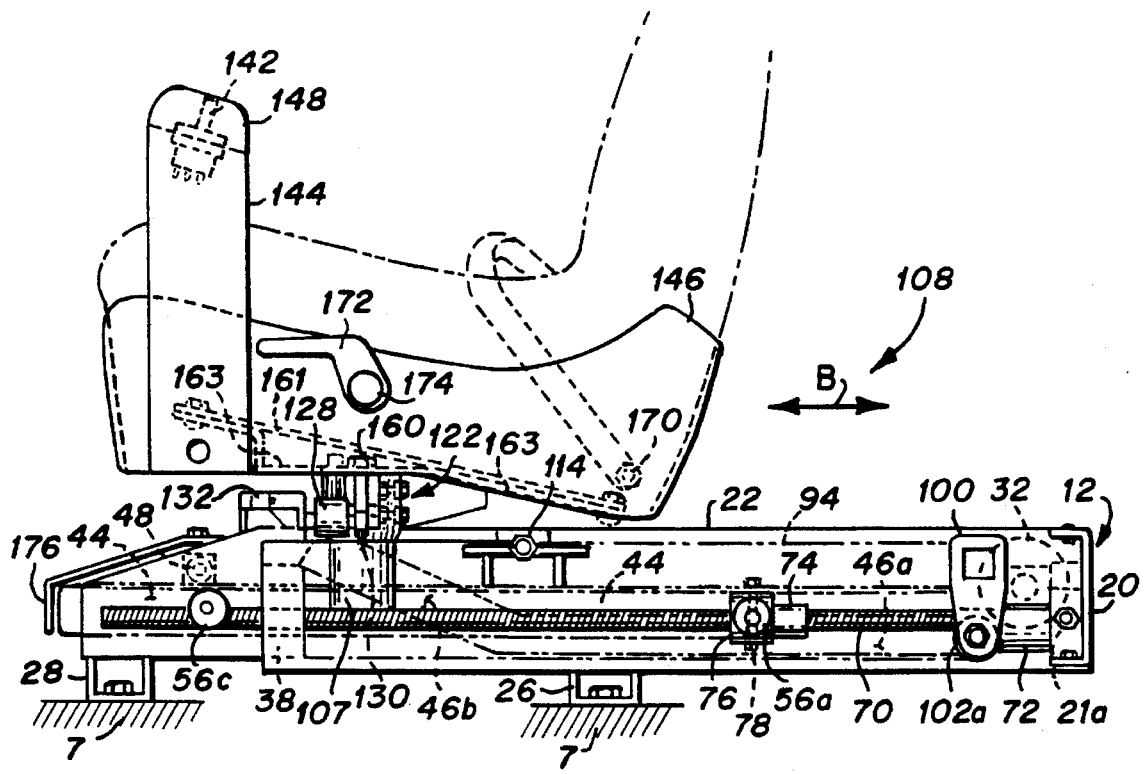
Fig_9

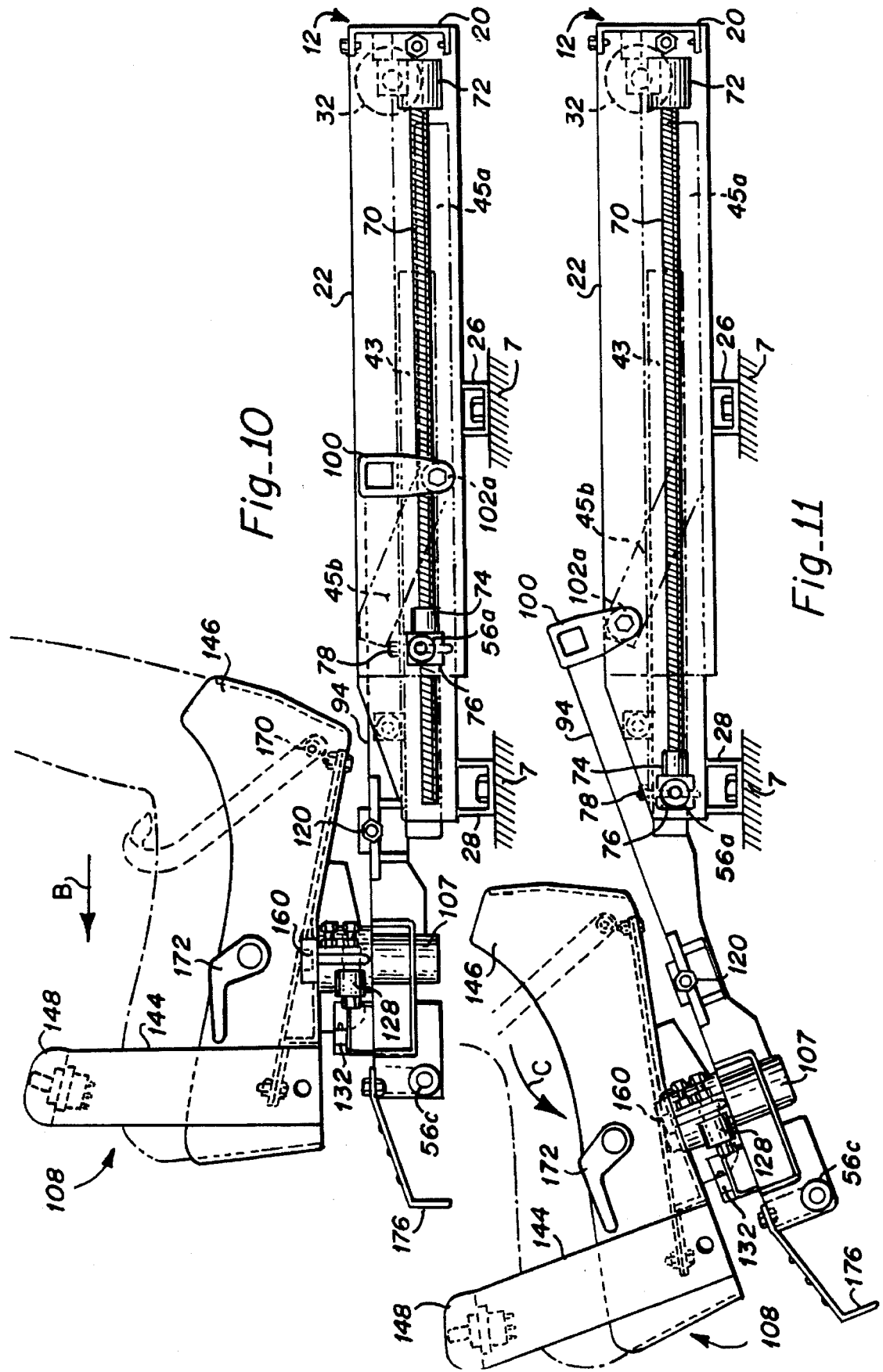

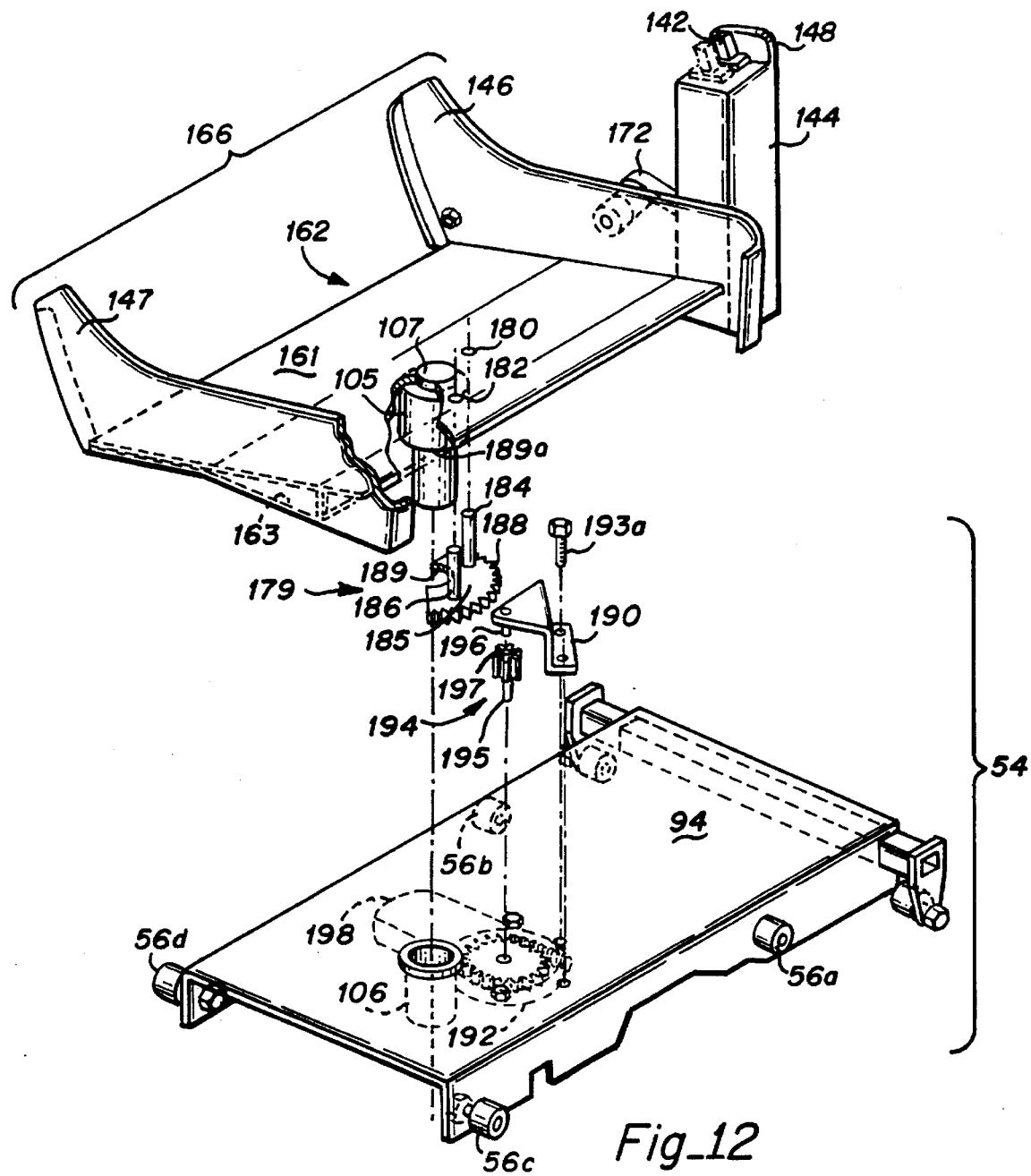
Fig_12

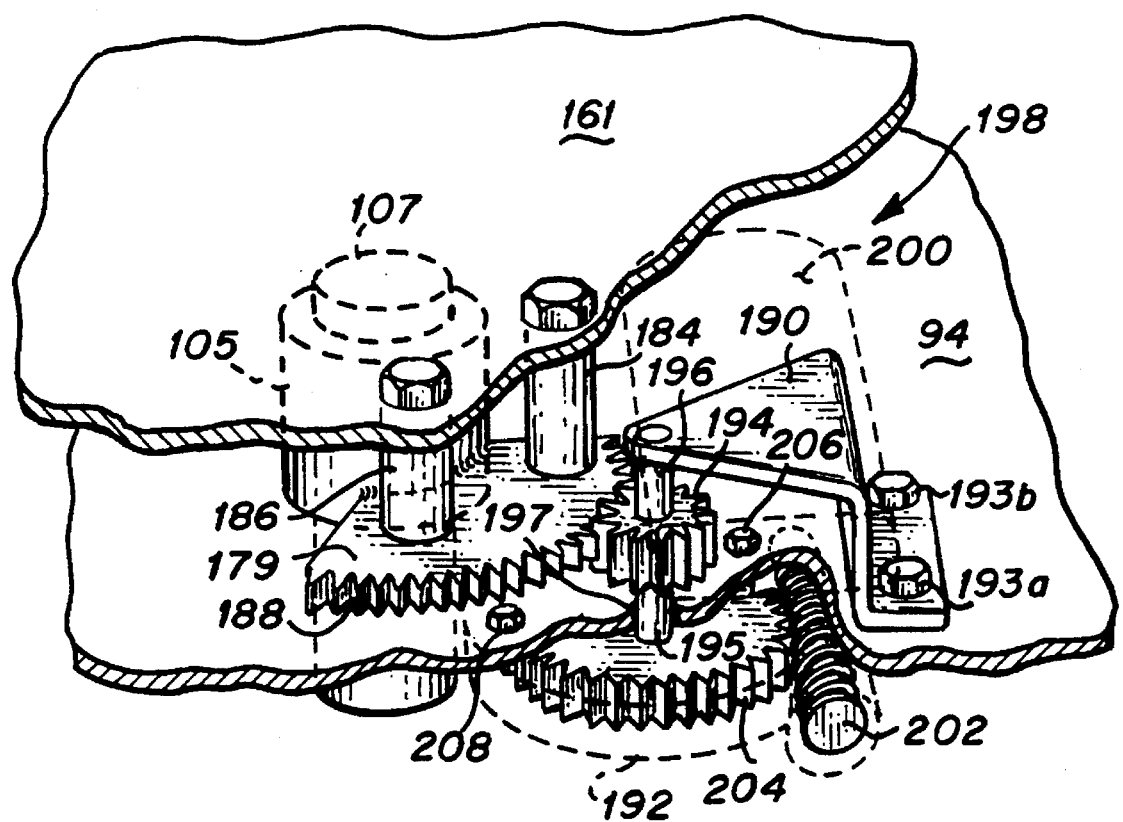
Fig_13

SEMI-AMBULATORY COMPANION SEATING SYSTEM AND METHOD

FIELD

This invention relates to power seat systems for vehicles, and more particularly to assisted seating systems for semi-ambulatory persons. After opening a side door, a seat, typically a front passenger seat, is rotated manually or powered from a normal or forward-facing position to a side-facing position. The rotated seat is extended laterally outward from the vehicle. During the lateral movement the seat drops and its leading edge tilts downward to assist a semi-ambulatory person in getting onto and off of the seat. Once seated, the seat lifts and retracts into the vehicle envelope and is then pivotable, manually or powered, to the forward-facing seating position.

BACKGROUND

A wide variety of power seats are currently available for automobiles and vans which have an extended range of motions, including forward-back, tilt and elevation-lowering. These seats are generally used by fully ambulatory drivers and front seat passengers. In larger vans, "captain"-type chairs may be employed which have a custom base permitting the passenger seat to be rotated to a rear-facing position by a manual swivel with locking engagement to lock the seat in one or more positions.

A wide variety of people using vehicles as passengers or drivers require some sort of assistance in entering and exiting the vehicle. For those who are significantly impaired, there are a wide variety of wheelchair lifts and ramps, and combinations of drawbridge-type scissor ramps and lowered floor vans. An example of a rotary lift is shown in Braun et al. U.S. Pat. No. 4,664,585, which is offered as the Swing-A-Way® rotor lift by The Braun Corporation of Winamac, Ind. Braun also offers slide tube type van lifts and ramps. The L220 transit vehicle lifts with fold-up platform features include Czech et al. U.S. Pat. No. 5,180,275 of the Braun corporation. The U.S. Pat. No. 5,261,779 issued to Goodrich shows Braun's dual hydraulic parallelogram wheelchair lift for vans and transit vehicles. Once in the van, the wheelchair-bound person can use a variety of assist devices to permit the transfer from the wheelchair onto a special seat within the van, or lockdown of the wheelchair itself without passenger transfer.

However, there is a much greater population of persons with less severe impairments who nevertheless need some assistance entering and exiting vehicles. These people include those who are physically handicapped due to illness, injury, or inherent conditions, persons who have suffered varying degrees of strokes, and a large portion of the aging population whose infirmities make it very difficult for them to enter and exit vehicles, particularly high floor vehicles such as vans and transit vehicles. Even fully ambulatory persons have some difficulty entering and exiting certain vehicles, particularly low-slung sports cars. But the problem is exacerbated in the case of vans having a much higher floor and seat level which basically entails a climb up onto the seat followed by sliding the body laterally into position on the seat. As compared to the number of persons who are fully handicapped and in wheelchairs or electric scooters, the semi-ambulatory population is ten to twenty times larger.

Exemplary of the approaches used to address vehicular entry/exit seating are U.S. Pat. Nos. 4,483,653 (Waite); 4,155,587 (Mitchell); and 4,733,903 (Bailey).

However, none of these approaches address the problem of entry/exit from vehicles having higher floors. Nor do they provide for proper orthopedic ergonomic alignment of the seat to the semi-ambulatory user. That is, in these devices while the seat may extend laterally from the vehicle in a more or less complex motion, they do not lower. And more importantly, in these devices the leading edge of the seat is not tilted downward so that more seating area is exposed for the semi-ambulatory person to contact. In these devices, the semi-ambulatory person is confronted with the non-tilted leading edge of the seat, and must lift themselves both up and over the leading edge, and onto the seat, and then back into the seat back in order to be properly seated. These devices are simply not designed from the point of view of the semi-ambulatory user nor for use in high-floor vehicles.

Accordingly, there is a need for a companion seating assist device to assist semi-ambulatory persons to be seated exteriorly of the vehicle, and then to be retracted into the vehicle and rotated to the forward position, which device provides ample clearance for feet and legs, and not only lowers but tilts to present an ergonomically improved seat mounting angle.

THE INVENTION

Objects

It is among the objects of this invention to provide a companion seating system to assist semi-ambulatory persons to be seated exterior of the vehicle, and then to be withdrawn into the vehicle envelope and rotated to a forward-facing seating position, and the reverse for exit of the vehicle.

It is another object of the invention to provide an improved method of seating persons having the need of assistance for entry and exit of vehicles.

It is another object of the invention to provide an improved mechanism that has multi-directional motion to rotate the passenger seat from a forward-facing position to a side-facing position and back, and to selectively extend, lower and tilt the seat exteriorly of the vehicle envelope upon extension from the vehicle, and to reverse that motion upon retraction of the seat into the vehicle.

It is another object of the invention to provide a seating system which can use the standard seat provided with the vehicle which is securable to the seating assist device of this invention so that the seating assist device of the invention can be retrofit in existing vehicles, and can be changed from one vehicle to another upon trade-in, sale or junking of the vehicle.

Still other objects of the invention will be evident from the specification, drawing and claims of this application.

DRAWINGS

The invention is illustrated by reference to the drawings in which:

FIG. 1 is a rear perspective view showing a seat having a semi-ambulatory passenger, depicted in broken lines, sitting thereon, the seat attached to a semi-ambulatory companion seating system of the present invention, rotated to a fully deployed position, wherein the leading edge of the seat is in a downward tilted position;

FIG. 2 depicts the seat, shown in FIG. 1, fully rotated to a side exit-facing or outboard-facing position but disposed substantially horizontal and partially retracted into the passenger compartment;

FIG. 3 illustrates the seat fully retracted into the passenger compartment, and partially rotated to a home or forward-facing position;

FIG. 4 is an isometric view depicting the semi-ambulatory companion seating system of the present invention in a locked transport position and being partially broken away to illustrate the major components of the seating system;

FIGS. 5 and 6 together are an exploded isometric view of the semi-ambulatory companion seating system of the present invention with FIG. 5 showing the base unit assembly and FIG. 6 showing the carriage and seat support assemblies;

FIG. 7 is an enlarged isometric view of the seat latch slot adjustment assembly;

FIGS. 8–11 are rearwardly looking elevation views of the seating system of the present invention during a sequence of operation including the home or forward-facing position (FIG. 8), the side exit-facing or outboard-facing position (FIG. 9), the outboard-facing position with the seat extended horizontally fully outboard of the vehicle envelope (FIG. 10), and the fully deployed position wherein the leading edge of the seat is in a downward tilted position (FIG. 11);

FIG. 12 is an exploded view of a power seat rotation mechanism, which is a non-preferred alternative to the manual seat rotation; and FIG. 13 is an isometric view of the gear drive interconnection between the seat and the motor for the power seat rotation mechanism of FIG. 12.

SUMMARY

The invention comprises a seating system to assist semi-ambulatory passengers of automotive vehicles into and out of the vehicle, which seating unit has compound motion including: first, a manual or powered rotary motion to permit the passenger to rotate from a forward facing position to a side exit-facing position; second, a powered motion laterally outboard to approximately the threshold (door frame) of the vehicle; and third, continuing the laterally outboard motion beyond the threshold while, simultaneously, the seat dips down and the leading edge of the seat tilts downwardly to permit the passenger to be positioned in a feet-on-the-ground position. On entry of the vehicle, those motions are reversed.

The seating system assembly comprises in combination a base unit assembly which is boltable to the standard bolt-hole pattern for attaching a passenger seat to a vehicle, here described typically with reference to a minivan, and which includes a seat cradle which accepts and to which is bolted the standard minivan seat. This permits use of the standard minivan seat which comes already provided with the vehicle. It also permits freely transferring the base unit from one vehicle to another as vehicles are changed through trade-in, sale or junking. That is, the vehicle owner can purchase the base unit separately, and then can transfer the base unit from vehicle to vehicle, using the standard van seat with each exchange.

The companion seating system includes a pivotable (i.e. rotatable) seat support assembly, the pivoting action of which may be powered or manually actuated, and lockable into a variety of positions, principal among them being a home or forward-facing position, and a side exit-facing or outboard-facing position. In turn, this seat support assembly is extended laterally, i.e. extended outboard of the vehicle, by a power drive disposed in a base unit assembly to a position in which the seat is external of the vehicle. The base unit assembly includes mechanical linkages providing both a lowering and tilting motion. The tilting motion tilts the leading edge of the passenger seat in a downward direction to present an ergonomically improved seating aspect to a user.

The base unit assembly also includes a power track subassembly comprising a rectangular framework which is oriented in the lateral axis of the vehicle and its mounted position. The power track subassembly includes two rails: a forward rail having an external and an internal track, and a rear rail having an external and an internal track. A carriage assembly is guided along both pairs of tracks to provide both the lateral, i.e. exit/enter motion, and the downward tilt/descent motion. The base unit includes a cover and a carriage drive subassembly.

The carriage assembly includes a generally rectangular framework assembly, having a plurality of rollers or other transfer means to permit the carriage to move laterally on the base subassembly tracks. In the principal embodiment, six rollers are employed, four guided in the internal tracks, and two guided in the external track. The outer two carriage rollers are mounted on an outrigger at the inboard end of the carriage assembly.

The external track of each rail of the base subassembly has a generally horizontal section and terminates in an upwardly inclined section; by comparison, the internal track of each rail is horizontal throughout. By following the horizontal section, the carriage moves out laterally. Then, by following the inclined section, the inboard end of the carriage arises while simultaneously pivoting on the midpoint rollers so that the outboard end of the carriage dips or descends downwardly, while at the same time continuing and completing its outward motion. The outboard end of the carriage assembly also includes an axle bushing for receiving the axle of a pivotable seat support assembly mounted thereon.

The seat support assembly includes a seat base box-plate assembly having holes aligned to receive bolts of a standard vehicle seat. The inboard and outboard sides of the seat boxplate terminate in upstanding trim panels which together form a cradle for receiving the standard vehicle seat. An actuator switch housing is preferably mounted on the inboard seat trim panel. The inboard or outboard seat trim panel is apertured, depending on the vehicle model, to receive the seat belt securement and the seat recline lever therethrough. In addition, on the underside of the seat base plate a latch assembly is included to engage the rotatable seat support assembly in either the forward-facing position or the outboard-facing position. The latch assembly also includes a means for engaging an interlock switch so that the seat may not be transported laterally outboard until the seat is positively engaged in the side exit-facing or outboard-facing position.

In an alternate embodiment, instead of a manual seat rotation system, a powered seat rotation mechanism may be provided.

In use, the semi-ambulatory passenger approaches the vehicle with the seat assembly in a fully deployed position. That is, the vehicle door is open, the seat is rotated to the side exit-facing or outboard-facing position and powered out to its fullest outboard extent. In this position, the seating surface is tilted downwardly, and outboardly by the degree of tilt imparted by the angle between the external track incline section as compared to the horizontal section. The seat in a typical van application is lowered on the order of 4–8 inches, typically about six inches. The semi-ambulatory person may then simply cup to the seat in a natural, partially bent over position. The leading edge of the seat in the deployed, tilted position is more nearly the same distance off the ground as the inside of the knee so the seat is easy to sit-on. The seat, upon retraction, tilts back to a normal, normally horizontal position.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 is a rear perspective view of a motor vehicle 1 (here a van or minivan), shown in broken lines, with a door 5 and a side door (not shown) opened to show a passenger compartment 2 and a floor 7. A standard O.E.M. seat 4 having a semi-ambulatory passenger 3, depicted in broken lines, sitting thereon, is attached to a semi-ambulatory companion seating system 9 of the present invention which is attached to the floor 7 of the passenger compartment 2. For reference to motions of the seating system, a forward direction 6a, a rear direction 6b, an outboard direction 8a, and an inboard direction 8b, associated with the vehicle 1 and the seating system 9 are also illustrated. As shown in FIG. 1, the seat 4 is fully deployed, i.e. the seat 4 is rotated to a side exit-facing (or outboard-facing) position, extended outboard of the passenger compartment 2, and tilted obliquely downward such that the feet of the passenger 3 are in contact with the ground surface 10.

FIG. 2 depicts the seat 4, in an identical rotated side-facing position but disposed substantially horizontal, i.e. parallel to the ground surface 10, and partially retracted inboard into the passenger compartment 2. In this position, the feet of the passenger 3 are above the surface 10, i.e. the passenger 2 is lifted off the ground 10.

FIG. 3 illustrates the seat 4 fully retracted into the passenger compartment 2, and rotated to a partially forward-facing position. It will be appreciated that the rotation of the seat 4 can be continued until the seat 4 is disposed in a home, or full forward-facing position.

FIG. 4 is an isometric view depicting the semi-ambulatory companion seating system 9 of the present invention in a locked transport position and being partially broken away to illustrate the major components of the seating system 9. FIGS. 5 and 6 are a two-part exploded isometric view of the fundamental parts of the system 9. Viewing FIGS. 4–6 together, the system will be described from the bottom up, which is to say from a base unit assembly 12 to each succeeding assembly which is mounted thereon.

The base unit assembly 12 comprises a power track subassembly 14 including a generally rectangular frame having a forward side rail 16 and a rear side rail 18. When the subassembly 14 is mounted in the vehicle 1, these side rails are spaced apart, and take their names from their general position, that is, the forward side rail 16 faces forwardly (6a) in the vehicle 1 and the rear side rail 18 faces rearwardly (6b). The side rails 16, 18 are connected to and terminate in an inboard plate 20, which conveniently includes a plurality of cover mounting flanges 21a, 21b, and 21c. Note that the inboard plate 20 extends both forwardly, rearwardly and upwardly beyond the extent of the side rails 16, 18 so that a cover 22 when mounted thereto, is spaced above and outwardly of the side rails 16, 18 to provide appropriate clearance. The side rails 16, 18 are mounted on, or are upward extensions of a bottom plate 24. Secured on the underside of plate 24, and disposed medial of the inboard plate 20 and the outboard ends 16a, 18a of the side rails 16, 20 is an inboard mounting channel 26. Adjacent the outboard ends 16a, 18a of both the side rails 16, 18 and mounted to the underside of bottom plate 24 is an outboard mounting channel 28. These mounting channels 26, 28 include holes 26a, 26b, 28a and 28b which are coordinate with the standard mounting bolt pattern for the OEM seats provided with the vehicle 1. Conveniently mounted adjacent the inboard end of the rear side rail 18 is a manual override access tube 30 which permits access to the motor 32 to permit manual cranking in the event of power failure or motor malfunction.

The outboard ends 16a, 18a of the side rails 16, 18 terminate in guide flanges 34 and 36 which are canted outwardly to guide access to internal tracks 43, 44 carried by the side rails as described in more detail below.

Spaced inwardly from the outboard ends 16a, 18a of the side rails 16, 18 are outboard cover mounting brackets 38, 40 to which outboard ends 42a, 42b of the cover 22 are secured. Each side rail 16, 18 carries a pair of tracks, a horizontal straight internal track 43, 44, respectively, and an external track 45, 46, respectively, each having an inboard horizontal straight section 45a, 46a and an outboard inclined portion 45b, 46b, respectively.

A lateral guide for the carriage is mounted on the inside of each side rail adjacent the outboard end. The guide is typically a plastic button 48 mounted to a bracket 50 which is located atop the internal rails 43, 44 and abutting the inside of a vertically extending flange 52 of each of the side rails 16, 18. This insures that as a carriage assembly 54 (FIG. 6) is retracting into the power track subassembly 14, that medial interior rollers 56a, 56b and outboard rollers 56c, 56d are properly aligned with the respective internal tracks 44. This prevents skewing of the carriage assembly 54 and the seat 4 when forces are placed on the seat 4 by the seating and movement of the passenger 3 during the outboard deployment and inboard retraction of the carriage assembly 54.

The inboard plate 20 also includes a drive gear box mount assembly, which in this embodiment comprises a pair of spaced, apertured plates 58, which receive a mounting bolt and nut 62 for a motor and gear box assembly 64. The carriage drive actuator subassembly 66 comprises the motor 32 which drives a ball screw 70 via a gear box 68 and a worm gear assembly 72. The ball screw 70 drives a ball nut 74 which in turn is secured via a U bolt 78 to a carriage drive angle bracket 76 (see FIG. 6).

As seen in FIG. 6, the outboard end of the ball screw 70 is inserted through a hole 80 in the outboard face of the angle bracket 76. The angle bracket 76 is terminated at each end by end pieces 82a and 82b which are also apertured to receive the medial interior set of rollers 56a, 56b, which are also termed the ball nut transfer assembly rollers 56a, 56b. Each roller 56a, 56b is journaled on a shaft which passes through holes 84a and 84b in their respective forward and rear carriage side rails 86, 88, and also through the holes 83a and 83b in the end pieces 82a, 82b of the angle bracket 76. Thus, as the motor 32 drives the ball screw 70 through the gear box 68, the ball nut 74, being secured by the U bolt 78 to the angle bracket 76, in turn drives the carriage assembly 54 outwardly (outboard 8*a*) or inwardly (inboard 8*b*).

The carriage assembly 54 includes forward and rear side rails 86, 88 depending from a top plate 94, and an inboard carriage end plate 90. Secured to the underside of carriage top plate 94 adjacent its outboard end is a U-shaped channel member 92. At the outboard end of each carriage side rail 86, 88 are fitted outboard interior carriage rollers 56*c*, 56*d*. Both the outboard carriage rollers 56*c*, 56*d* and the ball nut transfer assembly rollers 56*a*, 56*b* engage and roll in the internal track 44 of the base unit subassembly 14. In the tilting motion, the carriage subassembly 54 pivots on an axis defined by the shafts of the ball nut transfer assembly rollers 56*a*, 56*b* which are medial of the inboard and outboard ends of the carriage.

Adjacent the inboard end of the carriage assembly is an outrigger subassembly 96 which comprises a transverse rectangular tube 98 which fits in notches 99*a* and 99*b* in the forward and rear carriage side rails 86, 88 as shown. Each of the ends of the tube 98 carry a bearing plate 100*a*, 100*b* which extends downwardly a sufficient distance to receive an inboard exterior roller 102*a*, 102*b*, whose axles 104 are parallel with the axles of both the ball nut transfer assembly rollers 56*a*, 56*b* and the outboard interior carriage rollers 56*c*, 56*d*. When the carriage is in its home position the axles of rollers 56*a*, 56*b*, 56*c*, and 56*d* are coplanar. The home position is defined as a fully retracted position of the carriage inside the vehicle, with the seat rotated to a forward-facing position. Note that the transverse rectangular tube 98 extends beyond the carriage side rails 86, 88 a distance sufficient to space the inboard exterior rollers 102*a*, 102*b* within the external tracks 45, 46 of the side rails 16, 18, respectively, of the base subassembly 14. Note also that both the internal tracks 43, 44 and the external tracks 45, 46 comprise C-shaped brackets with both a top and bottom surface to fully capture the rollers.

An axle bushing and sleeve assembly 106 is fitted in aligned holes in the carriage top plate 94 and the channel member 92 to receive an axle 107 of the pivotable seat support assembly 108 (top half of FIG. 6). An axle collar 105 surrounds an upper portion of the axle 107 and is disposed above the sleeve assembly 106. As best seen in FIG. 7 a keystone-shaped aperture 110 is provided medial of the inboard and outboard ends of the top plate 94 to form a latch slot 112 for a forward-facing pivot stop position of the seat support assembly 108. It also provides access to an adjustable stop bolt 114 which adjusts the width of the latch slot 112. The stop bolt 114 is mounted in a hole 115 formed in an upwardly extending flange 116 of a stop bolt bracket 118 secured to the underside of the top plate 94 aligned with the opening. By rotating the bolt 114, the width of the latch slot 112 can be adjusted to receive the key 120 of the manual latch 122. This latch is pivotally secured to the underside of the seat assembly 108 between a pair of spaced brackets 123*a* and 123*b* forming a latchway assembly 124.

Mounted to the top face of the carriage top plate 94 adjacent the outboard end is an inverted U-shaped bracket 126 oriented with the bracket being opened to the forward position, that is, toward the forward carriage side rail 86. This provides inboard and outboard vertical faces 127*a*, 127*b*. A bumper 128 is secured to the inboard face 127*a* to provide a positive resilient surface to stop the rotational motion of the seat support assembly 108 from the forward-facing position 6*a* to the outboard-facing position 8*a*. In the outboard-facing position, the inner face 129 of bracket 123*a* engages bumper 128 and the key portion 120 of the manual latch 122 interfits in latch slot 130 provided adjacent the forward edge of the carriage assembly top plate 94. An interlock switch 132 is attached to an interlock switch housing 134 secured both to the U-shaped bumper bracket 126 and the top plate 94. The interlock switch 132 is mounted in the switch housing 134 so that a notch 136 formed in the housing permits a switch contact face 138 of the latchway assembly bracket 124 to engage a switch reed 140 of the switch 132.

An actuating control circuit (not shown) is normally open so that only upon positive contact by the switch contact face 138 with the switch reed portion 140 will the circuit close and the motor 32 be enabled to power the carriage assembly 54 outwardly or inwardly. That is, the passenger seat 4 must be rotated from the FIG. 4 and FIG. 8 position to the outboard-facing position of FIG. 9 by pivoting on the axle 107 of the seat support assembly 108. Only then can an actuating control switch 142 on a handrest or switch housing (tower) 144 be enabled. The switch housing 142 is conveniently located on an inboard face and forward edge of the inboard seat trim panel 146. An upwardly extending tab 148 shrouds the switch 142 so that it is not accidently activated. The wiring is not shown in these diagrams, but it enters the subassembly 14 rear side rail 18 from a power source (not shown) via an aperture 150 (FIG. 5), and electrically interconnects the interlock switch 132, the actuating control switch 142 and the motor 32. The actuating control switch 142 is a DPDT switch with a neutral central position. Thus, both the switches 132, 142 must be engaged for the power to be applied either for the extension (outboard deployment) movement or the retraction (inward) movement, i.e. the 8*a*–8*b* and vice versa directional movement.

The manual latch 122 is pivoted about a pin 152 mounted in holes 156*a*, 156*b* in the spaced L-shaped brackets 123*a* and 123*b* of the latchway assembly 124. The spacing of the two brackets acts as a keeper for the latch 122. The latch 122 is also biased by a spring 158 into its downward or locked position with the key 120 fitting either into the latch slot 112, (for the forward-facing pivot stop position) or the latch slot 130 (for the outboard-facing position). The passenger or operator must apply a vertically upward pressure (arrow 154) to an inboard tab 160 of the latch 122 to lift the key 120 out of either slot 112 or 130 so that the seat 4 can be rotated. Thus, the latch 122 is a positive engagement latch for safety.

When obtaining a new vehicle, the original equipment seat 4 is unmounted from its seat base (not shown), the base is unbolted from the vehicle floor 7 (FIG. 1–3), and the companion seat system 9 (FIG. 1–3) of this invention is put in its place with the mounting holes 26*a*, 26*b*, 28*a*, 28*b* of the mounting channels 26 and 28 aligning with the OEM holes (not shown) on the vehicle floor 7. The companion seating system 9 of this invention is then bolted in place to the vehicle floor 7. The wiring assembly (not shown) is then hooked to the vehicle power supply. Then the original equipment seat 4, which has been previously removed from its base is fitted onto the seat cradle assembly 166 of the seat support assembly 108, and bolted to a seat base box plate assembly 162. The plate assembly 162 includes an upper plate 161 and a lower plate 163. As is best seen in FIG. 4 and 9, a first portion of the lower plate 163 is disposed adjacent and parallel to the plate 161. A second portion of the plate 163 extends from the first portion and diverges away from plate 161 and then bends back towards plate 161. This OEM seat (not shown in FIG. 7) is bolted to the seat base box plate assembly via nut and bolt sets 164*a, b, c* and *d*. The seat belt is reinstalled in the seat belt weld nut 170 shown on the inboard seat trim panel 146. The process of fitting the OEM seat 4 includes inserting the seat recline latch release shaft (not shown) into a hole 174 in the inboard seat trim panel 146, and the OEM seat recline lever 172 is then fitted back onto its shaft. This completes the installation, and permits the companion seating system of this invention to be transferred from vehicle to vehicle as the vehicle owner requires.

A kick plate 176 is bolted to the outboard end of the carriage top plate 94 to prevent access to the interior mechanisms of the carriage subassembly 54 and the base unit assembly 12 for safety reasons. Also, a cutout region 178 in the base unit cover 22 (FIG. 5), is tailored to shroud as much of the internal mechanisms as possible when the carriage subassembly 54 is in its full outboard extended or deployed position. In addition, sliding or trailing covers (not shown) which are carried on either the base unit 12, the carriage 54 or the seat support assembly 108 may be supplied as desired to prevent access to the interior of the mechanism. For example, a tough plastic accordion cover, or heavy duty carpeting, or overlapping plates may be employed. These plates, in a tambour arrangement or accordion assembly, retract out of the way when the carriage moves inwardly to its home position, and extend outwardly when the carriage is deployed.

FIGS. 8–11 are rearwardly looking elevation views of the seating system 9 of the present invention, and illustrate a sequence of operation from the home or forward-facing position (FIG. 8), to the fully rotated outboard-facing or side exit-facing position (FIG. 9), to a partial outboard-extended position (FIG. 10), and to the fully deployed, downwardly tilted and lowered position (FIG. 11).

FIG. 8 illustrates the seat support assembly 108 in the home or forward-facing position. As shown in the figure, the inboard and outboard mounting channels 26, 28 of the base unit assembly 12 are attached to the vehicle floor 7. The key 120 of the manual latch 122 is engaged in the latch slot 112 (FIG. 7) thereby preventing the rotation of the seat support assembly 108. In order to enable rotation of the seat assembly 108, the manual latch 122 is pivoted about pin 152 in an upward direction (arrow 154 in FIG. 6) until the key 120 clears the slot 112. In this manner, the seat support assembly 108 may be manually (preferred), or electrically, rotated in the direction of an arrow A, about the axle 107, such that the seat is faced towards the outboard direction, shown in FIG. 9. See also FIG. 3.

In FIG. 9, the seat support assembly 108 is depicted as being fully rotated to the outboard-facing position. In this position the key 120 of the manual latch 122 is inserted into the latch slot 130 (FIG. 6) formed in the top plate 94, thereby locking the pivotable seat assembly 108 at the outboard-facing position. Also, the switch contact face 138 of the latchway assembly 124 engages the reed 140 of the interlock switch 132. The actuating control switch 142 can now energize the motor 32 to deploy the carriage assembly 54 and the seat support assembly 108 in the outboard direction. (See the sequence of FIGS. 9–11).

When the motor 32 is energized, the carriage assembly 54 and its rotationally supported seat assembly 108 are moved in either an inboardly or outboardly direction. In the sequence depicted in FIGS. 9–10–11 the carriage assembly 54 and the seat support assembly 108 are moved outboardly, i.e. in the direction of an arrow B. When the motor 32 rotates, the worm gear 72 also rotates thereby rotating the ball screw 70. As the ball screw 70 rotates, the ball nut 74 translates either inwardly or, as shown in the figure, outwardly (depending on direction of rotation). As described above, the ball nut 74 is carried by the angle bracket 76, which is drivingly attached to the carriage assembly 54 which slides along the internal 43, 44 and external tracks 45, 46 of the subassembly 14. Thus, as the ball nut 74 translates in the direction of arrow B, the carriage assembly 54 also moves in the B direction on the rollers 56a, 56b, 56c, 56d, 102a, and 102b. The rollers 56a and 56c (and the non-visible rollers 56b, 56d) are guided in the internal straight tracks 43, 44 while the roller 102a (and the other roller 102b) is guided along the outboard straight track sections 45a, 46a. This motion is from FIG. 9 to FIG. 10.

The carriage assembly 54 continues to move in the B direction even after the outboard rollers 56c, 56d leave the internal tracks 43, 44. Thereafter the carriage assembly 54 is suspended partially outboard of the base unit assembly 12. The roller 56a continues its movement in the internal track 43 while the roller 102a continues in the outboard track straight section 45a. As seen in comparing FIGS. 10 and 11, as the carriage assembly 54 continues to move in the outboard B direction, the carriage outboard roller 102a engages the inclined outboard track section 45b and begins to move along an upwardly inclined path that is elevated above the track 43 that contains the roller 56a.

As FIG. 11 clearly shows, as the ball nut 74 continues to move in the B direction the roller 56a remains in the track 43 and in a substantially horizontal plane, while the roller 102a continues in along an inclined path which terminates above the roller 56a. This causes the carriage assembly 54 to pivot about the axis formed by the medial rollers 56a and 56b (FIG. 6) thereby tilting the outboard end of the carriage assembly 54 down in the direction of arrow C (FIG. 11). When the carriage assembly 54 is tilted in this manner, the seat support assembly 108 of the system 9 is in the fully deployed position with the leading edge of the seat 4 obliquely inclined downward and in a lowered position. A semi-ambulatory passenger may, therefore, more easily engage the seat support assembly 108, and enter the vehicle. The seat drops about 6" below its stored position.

Power Seat Rotation Mechanism

In an alternate embodiment, shown in FIGS. 12 and 13, the seat cradle 166 can be rotated by a power seat mechanism drive assembly 198 mounted on the undersurface of the top plate 94 of the carriage assembly 54. The drive assembly 198 (as is best shown in FIG. 13) is attached via a plurality of attachment bolts 206 and 208 (others not shown) to the carriage top plate 94. The drive assembly includes a drive motor 200 attached to a drive worm gear 202 which in turn drives a transfer gear 204 in the desired rotating motion. These are enveloped in a housing 192 shown in phantom in FIG. 13. A gear shaft 195 (FIG. 12) is attached to the transfer gear 204 and is also attached at its other end to an output drive gear 194. The drive gear 194 is disposed above the carriage top plate 94 but beneath the lower plate 163 of the seat box plate assembly 162.

A gear keeper 190 is attached to the carriage top plate 94 by means of bolts 193a, 193b. A keeper shaft 196 extends downwardly from the gear keeper 190 and is engaged within an output drive gear shaft hole 197 formed in the upper surface of the output drive gear 194. In this manner, the gear keeper 190 retains the drive gear 194 in place above the drive assembly 198.

The output drive gear 194 is engaged with a gear tooth surface 188 formed on a sector gear 179 which is welded along a surface 189 to a corresponding surface 189a on a front portion of the axle collar 105. Two posts 184 and 186 extend upwardly from an upper surface 185 of the sector gear 179 and pass through corresponding holes 180 and 182 formed in the lower plate 163 of the seat box assembly 162. In this manner, a rotational force can be imparted by the gear 194 to the sector gear 179, and to the seat cradle 166, thereby rotating the seat cradle 166 in a powered fashion. The motor 200 is energized by a switch 142a disposed adjacent to the switch 142 mounted atop the handrest 144.

Although this power seat rotation is shown for clarity with the sector gear 179 attached to a front facing portion of the collar 105, it is preferred to have it on a rear facing portion so that it does not interfere with the latch assembly 122, the stop 128 and the reed switch 132, 140 and their associated brackets 126, 134.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A companion seating system for a vehicle comprising in operative combination:
   a) a base unit assembly mountable to a floor of a passenger compartment of a vehicle;
   b) a carriage assembly mountable in association with said base unit assembly;
   c) a seat assembly pivotably mountable to said carriage assembly for rotation between a first, forward facing, position, and a second, outboard facing, position;
   d) means for moving said carriage between a first position inboard said passenger compartment and a second position outboard said passenger compartment, and back; and
   e) said carriage moving means includes means for lowering and tilting said seat assembly to an ergonomically improved mounting angle to assist a semi-ambulatory person to more easily mount onto said seat assembly when disposed outside said passenger compartment and to be moved into said passenger compartment, and in a reverse operational sequence, to permit said person to be moved out from said passenger compartment and into said ergonomically improved mounting angle so as to enable said person to more easily dismount from said seat assembly.

2. A companion seating system as in claim 1 wherein:
   a) said carriage moving means includes means for power assisted driving of said carriage assembly between said first inboard and said second outboard positions, and back.

3. A companion seating system as in claim 2 which further includes:
   a) means associated with said seat and said carriage assemblies for selectively lockingly engaging said seat assembly in said first, forward facing, position or said second, outboard facing, position.

4. A companion seating system as in claim 3 which further includes:
   a) means for actuating said power assist means to permit extension and retraction of said carriage between said first inboard and said second outboard positions, or reverse, when said seat assembly is rotated to said second, outboard facing, position.

5. A companion seating system as in claim 4 wherein:
   a) said carriage assembly includes a plurality of rollers; and
   b) said base unit includes at least one track receivingly engaging said carriage rollers, said track guiding said rollers to permit said carriage assembly to move substantially horizontally into and out from said passenger compartment, and to tilt downward and lower at least an outboard edge of said carriage assembly to provide said ergonomically improved mounting angle.

6. A companion seating system as in claim 5 wherein:
   a) said track includes a first horizontal section and a second section angled upwardly from and connected to said horizontal section; and
   b) said rollers include at least one roller disposed adjacent an inboard edge of said carriage assembly.

7. A companion seating system as in claim 2 which further includes:
   a) means for actuating said power assist means to permit extension and retraction of said carriage between said inboard and outboard positions, or reverse, when said seat assembly is rotated to said second, outboard facing, position.

8. A companion seating system as in claim 7 wherein:
   a) said carriage assembly includes a plurality of rollers; and
   b) said base unit includes at least one track receivingly engaging said carriage rollers, said track guiding said rollers to permit said carriage assembly to move substantially horizontally into and out from said passenger compartment, and to tilt downward and lower at least an outboard edge of said carriage assembly to provide said ergonomically improved mounting angle.

9. A companion seating system as in claim 8 wherein:
   a) said track includes a first horizontal section and a second section angled upwardly from and connected to said horizontal section; and
   b) said rollers include at least one roller disposed adjacent an inboard edge of said carriage assembly.

10. A companion seating system as in claim 5 wherein said base unit assembly includes:
    a) a bottom plate which is attachable to said floor of said vehicle;
    b) a pair of spaced apart side rails extended upwardly from said bottom plate, each of said side rails having an inboard end, an outboard end, an inner surface and an outer surface; and
    c) an inboard plate connected to each of said inboard ends of each of said side rails, said inboard plate having an inner surface and an outer surface.

11. A companion seating system as in claim 10 wherein said carriage assembly includes:
    a) a top plate having an aperture, an inboard edge, an outboard edge, a forward edge, a rear edge;
    b) an axle bushing disposed through said aperture; and
    c) a pair of spaced apart side plates depending from said forward and said rear edges.

12. A companion seating system as in claim 11 wherein said carriage moving means includes:
    a) an internal track formed on said inner surface of each of said side rails, each of said internal tracks disposed parallel to said bottom plate;
    b) an external track formed on said outer surface of each of said side rails, each of said external tracks having an inboard portion and an outboard portion;
    c) said inboard portion of each said external tracks being disposed substantially parallel to said bottom plate;
    d) said outboard portion of each said external tracks extending obliquely upwards from said second open end, each of said outboard portions terminating proximate said outboard end of each said side rails;

e) a pair of inboard rollers, a center of each of said inboard rollers defining an inboard roller axis disposed proximate and parallel to said inboard edge of said top plate, each of said inboard rollers attached to and extended beyond each of said depending side plates such that each said inboard rollers is engagable within each of said external tracks;

f) a pair of outboard rollers, a center of each of said outboard rollers defining an outboard roller axis disposed proximate and parallel to said outboard edge of said top plate, each of said inboard rollers attached to each of said depending side plates such that each said outboard rollers is engagable within each of said internal tracks;

g) a pair of medial rollers, each of said medial rollers disposed intermediate each said inboard and said outboard rollers, and attached to each of said depending side plates such that each said medial rollers is engaged within each of said internal tracks; and h) said driving means is associated with said base unit and said carriage assemblies for moving said carriage assembly between a substantially horizontal position to a fully-outboard extended, lowered, and tilted downwards position such that said carriage assembly is disposed at said ergonomically improved mounting angle; and i) while said carriage assembly is in said substantially horizontal position, each of said outboard rollers and each of said medial rollers are engaged within said internal track, and each of said inboard rollers are engaged within said inboard portions of each said external tracks, and ii) while said carriage assembly is in said fully-outboard extended, lowered, and tilted downwards position, each of said outboard rollers are disengaged from each said internal tracks, each of said inboard rollers are engaged within each said outboard portions of each said external tracks, and said top plate of said carriage assembly is tilted downwardly about a pivot axis drawn through a center of each of said medial rollers which are engaged within each said internal tracks.

13. A companion seating system as in claim 12 wherein:

a) said seat assembly includes a seat base plate for receiving thereon a seat of said vehicle, and an axle extending downwardly from said seat base plate and insertable into said axle bushing such that said seat assembly is pivotable from said first, forward facing, position to said second, outboard facing, position.

14. A companion seating system as in claim 13 wherein:

a) said means for actuating said carriage moving means is positionable between a first and a second state, is attached to said seat assembly, and is in electric communication with said driving means such that:

i) when said actuating means is positioned at said first state, said driving means is energized and said carriage assembly is moved along said internal and said external tracks; and ii) when said actuating means is positioned at said second state, said driving means is not energized.

15. A companion seating system as in claim 14 which includes:

a) a first elongated slot formed in said top plate;

b) a second elongated slot formed in said top plate, a longitudinal axis of said first slot being disposed perpendicularly to a longitudinal axis of said second slot; and c) a latch being pivotally mounted to said seat base plate and having a key portion extending downwardly from said latch and being engagable in either of said first and said second slots:

i) such that when said key portion is engaged in said first slot, said seat assembly is locked in said first, forward facing, position; and ii) when said key portion is engaged in said second, slot, said seat assembly is locked in said second, outboard facing, position.

16. A companion seating system as in claim 15 wherein:

a) said first elongated slot includes at least one moveable side wall for varying the transverse spacing of said first elongated slot.

17. A companion seating system as in claim 16 which includes:

a) interlock means having a switch attached to said top plate and disposed adjacent said second elongated slot, said switch being in electric communication with each of said actuating means and said drive means and being engagable with a switch contact face attached to said seat base plate, such that:

i) when said seat assembly is in said second, outboard facing, position, said contact face is engaged with said switch which is operative to permit said actuating means to energize said drive means; and ii) when said seat assembly is in a position other than said second, outboard facing, position, said contact face is not engaged with said switch which is operative to prevent said actuating means from energizing said drive means.

18. A companion seating system as in claim 17 wherein said drive means includes:

a) a drive motor having an input shaft and an output shaft, said drive motor being attached to said inner surface of said inboard plate and being in electric communication with said actuating means;

b) a ball screw mechanically coupled to said drive motor, said ball screw being longitudinally aligned parallel to each of said side rails; and c) a ball nut threaded onto said ball screw and attached to said top plate of said carriage assembly, such that when said drive motor is energized, said output shaft and said ball screw are rotated, and said ball nut is translated along said ball screw thereby moving said carriage assembly along said internal and said external tracks.

19. A companion seating system as in claim 18 wherein said drive means further includes a mechanical override means attached to said input shaft of said drive motor for mechanically rotating said output shaft of said drive motor, thereby rotating said drive screw and said ball nut, and moving said carriage assembly along said internal and said external tracks.

20. A companion seating system as in claim 2 which includes:

a) means for power-assisted rotation for said seat assembly between said first, forward facing, position and said second, outboard facing, position and back.

21. A companion seating system as in claim 20 wherein said power-assisted rotation means includes:

a) a seat rotation drive motor having an output shaft, and being attached to said top plate of said carriage assembly;

b) a sector gear attached to said axle and mechanically coupled to said seat base plate;

c) transmission means attached to said output shaft of said seat rotation drive motor, and engaged to said sector gear; and d) rotation actuation means attached to said seat assembly and in electrical communication with said seat rotation drive motor, such that actuation of said seat rotation drive motor rotates said output shaft and said sector gear thereby rotating said seat disposed onto said seat base plate between said first, forward facing, position and said second, outboard facing, position.

22. A companion seating system as in claim 21 which includes:

a) a first elongated slot formed in said top plate;

b) a second elongated slot formed in said top plate, a longitudinal axis of said first slot being disposed perpendicularly to a longitudinal axis of said second slot; and c) a latch being pivotally mounted to said seat base plate and having a key portion extending downwardly from said latch and being engagable in either of said first and said second slots, such that when said key portion is engaged in said first slot, said seat assembly is locked in said first, forward facing, position, and when said key portion is engaged in said second, slot, said seat assembly is locked in said second, outboard facing, position.

23. A companion seating system as in claim 22 wherein:

a) said first elongated slot includes at least one moveable side wall for varying the transverse spacing of said first elongated slot.

24. A companion seating system as in claim 23 which includes:

a) interlock means having a switch attached to said top plate and disposed adjacent said second elongated slot, said switch being in electric communication with each of said actuating means and said drive means and being engagable with a switch contact face attached to said seat base plate, such that i) when said seat assembly is in said second, outboard facing, position, said contact face is engaged with said switch which is operative to permit said actuating means to energize said drive means; and ii) when said seat assembly is in a position other than said second, outboard facing, position, said contact face is not engaged with said switch which is operative to prevent said actuating means from energizing said drive means.

25. A companion seating system as in claim 24 wherein said drive means includes:

a) a drive motor having an input shaft and an output shaft, said drive motor being attached to said inner surface of said inboard plate and being in electric communication with said actuating means;

b) a ball screw mechanically coupled to said drive motor, said ball screw being longitudinally aligned parallel to each of said side rails; and c) a ball nut threaded onto said ball screw and attached to said top plate of said carriage assembly, such that when said drive motor is energized, said output shaft and said ball screw are rotated, and said ball nut is translated along said ball screw thereby moving said carriage assembly along said internal and said external tracks.

26. A companion seating system as in claim 25 wherein:

a) said drive means includes a mechanical override means attached to said input shaft of said drive motor for mechanically rotating said output shaft of said drive motor, thereby rotating said drive screw and said ball nut, and moving said carriage assembly along said internal and said external tracks.

27. A method of assisting a semi-ambulatory person to more easily enter into and exit from a passenger compartment of a vehicle, comprising the steps of:

a) providing a base unit assembly mountable to a floor of said passenger compartment of said vehicle;

b) providing a carriage assembly mountable in association with said base unit assembly;

c) providing a seat assembly pivotably mountable to said carriage assembly;

d) rotating said seat assembly from a first, forward facing, position, to a second, outboard facing, position;

d) moving said carriage assembly and said outboard facing seat assembly mounted thereon, from a first position inboard said passenger compartment to a second position outboard said passenger compartment; and e) lowering and tilting said outboard moved and outboard facing seat assembly from a substantially horizontal position to a fully deployed position having an ergonomically improved mounting angle to assist a semi-ambulatory person to more easily mount onto and dismount from said outboard moved and outboard facing seat assembly.

28. Method of assisting the entry and exit of a semi-ambulatory person from a vehicle as in claim 27 which includes the step of:

a) moving said seat assembly back into said vehicle, i) to carry said person seated on said seat assembly when said person mounts onto said seat, or ii) to retract said seat assembly after said person dismounts therefrom.

* * * * *